United States Patent [19]

Wagner et al.

[11] 4,246,160
[45] Jan. 20, 1981

[54] PROCESS FOR THE PRODUCTION OF AMINOPLAST DISPERSIONS

[75] Inventors: Kuno Wagner, Leverkusen; Jürgen Ick; Gerhard Ballé, both of Cologne, all of Fed. Rep. of Germany

[73] Assignee: Bayer Aktiengesellschaft, Leverkusen, Fed. Rep. of Germany

[21] Appl. No.: 664,324

[22] Filed: Mar. 5, 1976

[30] Foreign Application Priority Data

Mar. 21, 1975 [DE] Fed. Rep. of Germany ....... 2512385

[51] Int. Cl.$^3$ .................................................. C08K 5/05
[52] U.S. Cl. .......................... 260/33.4 R; 260/31.8 T; 260/33.2 R; 260/33.4 UR; 528/266; 528/269
[58] Field of Search ..................... 260/31.8 T, 33.2 R, 260/70 M, 58, 59, 70 R, 33.4 R, 33.4 UA; 528/266, 269

[56] References Cited

U.S. PATENT DOCUMENTS

| | | | |
|---|---|---|---|
| 2,983,593 | 5/1961 | Duke | 260/70 M |
| 3,231,525 | 1/1966 | Kelly | 260/70 R |
| 3,714,124 | 1/1973 | Hunsucker | 260/70 M |

OTHER PUBLICATIONS

Patterson, *German English Dictionary for Chemists*, 3rd Ed., Wiley, N.Y., 1963, p. 210.

*Primary Examiner*—Melvyn I. Marquis
*Attorney, Agent, or Firm*—Gene Harsh; Joseph C. Gil; R. Brent Olson

[57] ABSTRACT

The instant invention is directed to a process for the production of dispersions of aminoplast condensates in organic polyhydroxyl compounds by the oligo-condensation or polycondensation of substances capable of aminoplast formation, in said organic polyhydroxy compounds, the improvement wherein said dispersions are reacted at from about $-5°$ C. to about $180°$ C. with an amine compound selected from the group consisting of:

(a) organic aliphatic or cycloaliphatic mono or polyamines containing at least one primary or secondary amine group, and which are gaseous or liquid at room temperature, and
(b) organic alkyl hydrazines containing at least one primary or secondary amine group and which are gaseous or liquid at room temperature.

9 Claims, No Drawings

PROCESS FOR THE PRODUCTION OF AMINOPLAST DISPERSIONS

BACKGROUND OF THE INVENTION

U.S. application Ser. No. 464,099, filed Apr. 25, 1974, and the disclosure of which is herein incorporated by reference, relates to a process for the production of dispersions of aminoplast condensates in organic polyhydroxyl compounds, in which the production of the aminoplast condensates by the oligocondensation or polycondensation of substances capable of forming aminoplasts known per se, is carried out in the organic polyhydroxyl compounds as reaction medium.

The dispersions according to Ser. No. 464,099 show a number of remarkable advantages which are discussed in detail in the application.

Unfortunately, one disadvantage of most of the dispersions described in the application is the fact that they still contain small quantities of free formaldehyde and free, unreacted N-methylol groups. In addition to the strong odors given off, especially when these dispersions are used as reactants for polyisocyanates in the production of polyurethane foams, this results in the unfavorable side effect that the foams are not shrinkage-resistant. In other words, the foams produced therefrom do not retain their volume on completion of foaming, but instead show signs of shrinkage.

Although it was proposed in Example 6 of Ser. No. 464,099 to eliminate free formaldehyde in the aminoplast dispersions by treatment with gaseous ammonia to form hexamethylene tetramine, the total insolubility of the hexamethylene tetramine in the polyether used (and presumably its pronounced crystallinity in the cell "bridges" of the foams) surprisingly produced a marked decrease in the tensile strength of the foams produced therefrom.

DESCRIPTION OF THE INVENTION

It has now surprisingly been found that the unfavorable properties of the dispersions according to Ser. No. 464,099 can be eliminated by aftertreatment with the amines and hydrazines defined in detail hereinafter. At the same time, it is possible to obtain by this aftertreatment, if desired, an aminoplast dispersion containing catalysts which accelerate the isocyanatepolyaddition reaction, such catalysts being in the form of involatile reaction products of the amines or hydrazines with formaldehyde. Accordingly, when the dispersions which have been aftertreated in this manner are used for the production of polyurethane plastics, and more especially polyurethane foams, it is possible to greatly reduce the quantity of the catalysts normally used which are often expensive and/or toxic (see examples 23 and 24 herein).

Accordingly, the present invention relates to a process for the production of dispersions of aminoplast condensates in organic polyhydroxyl compounds by the oligocondensation or polycondensation of substances capable of forming aminoplasts, known per se, said oligocondensation or polycondensation being conducted in the presence of the organic polyhydroxyl compounds as reaction medium, which process is characterized by the fact that the dispersions thus obtained are aftertreated at a temperature of from about −5° C. to about 180° C. with organic aliphatic or cycloaliphatic mono- or polyamines containing at least 1 primary or secondary amine group which are gaseous or liquid at room temperature, or which organic alkyl hydrazines containing at least one primary or secondary amine group which are gaseous or liquid at room temperature.

The invention also relates to the use of the aminoplast dispersions obtainable by this process as reactants for polyisocyanates in the production of polyurethane plastics by the isocyanate-polyaddition process.

The dispersions to be aftertreated in accordance with the invention are produced in exactly the same way as described in the application Ser. No. 464,099, the disclosure of which is herein incorporated by reference.

As already mentioned, the dispersions produced according to Ser. No. 464,099 often contain a small quantity of free formaldehyde and/or unreacted N-methylol compounds. According to the instant invention, these troublesome constituents of the dispersions produced according to the earlier application are substantially eliminated by briefly treating the dispersions with nitrogen compounds capable of reacting with formaldehyde at temperatures in the range of from about −5° C. to about 180° C. and preferably at temperatures in the range of from about 10° C. to about 120° C.

Organic aliphatic or cycloaliphatic amines containing at least one primary and/or secondary amine group which are gaseous or liquid at room temperature, or organic alkyl hydrazines containing at least one primary or secondary amine group which are liquid at room temperature, are, as noted above, used for the aftertreatment of the dispersions produced according to the earlier application.

The organic amines suitable for use in the process according to the invention are preferably organic amines having a molecular weight of from 31 to 260 which contain aliphatic or cycloaliphatic, optionally hydroxyl-substituted or dimethyl amino-substituted hydrocarbon radicals. Hydrazine derivatives preferably used for the process according to the invention are, in particular, alkyl hydrazines having molecular weights in the range from 46 to 200.

The amines suitable for use in the instant invention are generally known and include such materials as methylamine, ethylamine, propylamine, ethylene diamine, hexamethylene diamine, N,N-dimethyl propylene diamine, methyl-bis-(3-aminopropyl)-amine, aminoethanol, diethanolamine, propanolamines, dipropanolamines, cyclohexyl-amine, 4,4'-diaminodicylcohexyl methane, 3,3,5-trimethyl-5-aminomethyl cyclohexylamine (=isophorone diamine), and the like.

The hydrazine derivatives useful in the instant invention are also generally known and include such materials as methyl hydrazine, ethyl hydrazine, propyl hydrazine, isopropyl hydrazine, n-butyl hydrazine, tert-butyl hydrazine, dodecyl hydrazine, 1,2-dimethyl hydrazine, 1,2-diethyl-hydrazine, 1,2-diisobutyl hydrazine, 1-butyl-2-methyl hydrazine and the like.

The presently preferred amine group containing materials are aminoethanol, 2-aminopropanol, diethanolamine, bis-(2-hydroxypropyl)-amine, N,N-dimethylpropylene diamine and methyl-bis-(3-aminopropyl)-amine.

In the process according to the invention, the amine group containing compounds are generally used in quantities which correspond to from between about 0.1 to about 4 mols, preferably from between about 0.01 and about 1 mol and most preferably, from between about 0.05 to about 0.4 mol of primary and/or secondary amino groups per 100 g of dispersed aminoplast solids.

In the process according to the invention, the amine group containing compounds react substantially spontaneously with formaldehyde under the specified reaction conditions and form condensation products containing tertiary nitrogen atoms which remain in the aminoplast dispersions aftertreated in accordance with the invention and which are active as catalysts for the isocyanatepolyaddition reaction. For example, ethanolamine reacts with formaldehyde under the reaction conditions according to the invention to form trihydroxy ethyl hexahydrotriazine. Diethanolamine reacts with formaldehyde under the reaction conditions according to the invention to form N-hydroxy ethyl oxasolidine. The N-methylol groups present in the untreated dispersions further react with the nigrogen compounds used in accordance with the invention by condensation to form N-CH$_2$-N-groups, so that the undesirable N-methylol groups are eliminated. In addition, there is no reformation of free formaldehyde in accordance with the following equation:

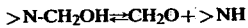

To carry out the process according to the invention, the gaseous amine group containing compounds are introduced into the dispersions produced according to earlier application at the aforementioned reaction temperatures. When liquid nitrogen compounds are used, it is sufficient to thoroughly mix the untreated dispersions with the aforementioned amine group containing compounds at the reaction temperatures specified.

In general, the afterreaction according to the instant invention under the above-mentioned conditions is complete after, at most, 1 to 10 minutes. While the reaction with the amines is substantially spontaneous, the reaction time indicated will generally be a function of the rate at which the amines are introduced. When gaseous or readily volatile liquid amine group containing compounds are used, their excesses may be readily removed, on completion of the aftertreatment according to the invention, by treating the dispersions according to the invention in vacuo under a pressure of, for example, from about 760 Torr to about 0.1 Torr and at a temperature of, for example, from about −5 to about 180° C., so that substantially odorless dispersions are formed. Removal of the free formaldehyde without treatment according to the instant invention is not possible because additional formaldehyde would always be reformed from the N-methylol compounds in accordance with the equation noted above.

The dispersions treated according to the invention have the following advantages over the untreated dispersions:

(1) The dispersions treated according to the invention are substantially odorless, not only because the free formaldehyde present in the untreated dispersions was removed, but also, and in particular, because there is no reformation of formaldehyde in accordance with the above noted equilibrium.

(2) In contrast to the untreated dispersions, the use of the dispersions according to the invention in the production of polyurethane foams does not result in undesirable shrinkage effects.

(3) The preferred dispersions aftertreated in accordance with the invention contain catalytically active nitrogen compounds in a quantity which is often sufficient for the production of polyurethane foams, with the result that it is possible in particular to greatly cut down on the addition of catalysts, for example, triethylene diamine.

In other respects, the dispersions aftertreated in accordance with the invention have all the advantages of the untreated dispersions, i.e., the functionality of the polyhydroxyl compounds remains intact, and foams produced from such dispersions have an outstanding compression hardness and improved flameproof properties.

In the following examples, all the parts quoted are parts by weight unless otherwise indicated.

EXAMPLES

Examples 1 to 12 below describe the production of formaldehyde-free aminioplast dispersions. In the final phase of production of the dispersions, small quantities of free formaldehyde are chemically bonded by reaction with the amine group containing compounds of the kind mentioned below, resulting in the formation of completely odorless dispersions without any tendency towards formaldehyde reformation.

EXAMPLE 1

(a) The polyether of this example, used for preparing the aminoplast dispersions, was obtained as follows:

Propylene oxide was polyadded with trimethylol propane as starter in the presence of catalytic quantities of sodium alcoholate. Ethylene oxide was then polyadded in a second phase. The liquid polyether contains primary hydroxyl groups. The weight ratio of the polyadded propylene oxide to the polyadded ethylene oxide is 83:17. The polyether used has an OH number of about 35 and a viscosity of 870 cP at 20° C.

(b) Preparation of the aminoplast dispersions:

16,926 parts of the polyether described in (a) are initially introduced into a 40 liter capacity vessel, heated with thorough stirring to 50° C. and freed from traces of oxygen in a water jet vacuum. The stirrer-equipped vessel is repeatedly flushed with nitrogen. The polyether is free from oxygen after 30 minutes. 368 parts of aqueous 1 N hydrochloric acid are then added, again under nitrogen. The polyether provided with the acid catalyst remains crystal-clear. The reaction vessel is then evacuated, followed by the dropwise addition over a period of 135 minutes at approximately 50° C. of a freshly prepared, filtered solution of 2760 parts of urea (46 mols), 4600 parts of a 30% formalin solution (46 mols) and 920 parts (8.14 mols) of ε-caprolactam. The above-mentioned reaction mixture is continuously introduced at a rate commensurate with that at which water is removed by distillation in vacuo (total input time: 2.25 hours). After stirring for 30 minutes, the reaction mixture is neutralized with 368 parts of 1 N sodium hydroxide in a nitrogen atmosphere. After neutralization, residual quantities of water are distilled off at 90° C./5 Torr. A total of about 4716 parts of water are removed, residual quantities of water being removed by brief heating in vacuo at 100° C. A bright white stable dispersion of polymethylene ureas corresponding to the general formula

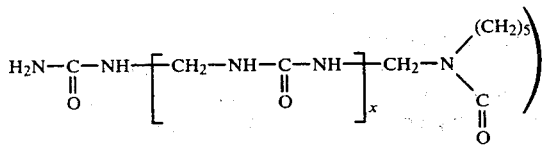

(x=10–12)
containing approximately 20% by weight of solids is obtained. Yield: 20,867 parts of aminoplast dispersion. The dispersion has a viscosity of 7,940 cP/25° C. The small quantity of salt formed be neutralization may remain in the dispersion without impairing its properties.

The formaldehyde left in this dispersion (approximately 0.6% by weight per 100 parts by weight of liquid dispersion) and unreacted N-methylol groups are completely removed over a period of 5 minutes by introducing 184 parts of methylamine at 20° C. Removal of the excess amine and trimethyl hexahydro triazine formed by vacuum treatment at 80° C./14 Torr leaves an odorless dispersion.

EXAMPLE 2

The procedure is exactly the same as in Example (1b), except that, before it is added to the polyether, the unreaformaldehyde solution is stored for 30 minutes at 40° C. in the presence of 20 parts of n-potassium hydroxide, the urea actually undergoing considerable methylolation during this preliminary storage period. Thereafter the procedure is exactly the same as in Example (1b) except that 368 parts of 1 N hydrochloric acid are used as catalyst. After polycondensation and neutralization in accordance with Example (1b) an indefinitely storable, stable white dispersion is obtained in which the polyether used has substantially the same OH number of 34.2. Free formaldehyde and unreacted N-methylol groups are bonded by reaction for 3 minutes at 30° C. with 319 parts of n-butylamine. The excess butylamine and the tributyl hexahydrotriazine formed are then removed over a period of 1 hour by vacuum treated at 120° C./14 Torr. An odorless aminoplast dispersion containing N,N',N"-tributyl hexahydrotriazine is formed.

EXAMPLE 3

The procedure is as in Example (1b), except that the quantity of the reaction mixture is reduced 100 fold. In other words, it consists of 169.3 parts of polyether with the composition described in Example (1a), 27.6 parts of urea, 46 parts of 30% formalin solution, 9.2 parts of ε-caprolactam. Another difference is that 3 parts of ammonium chloride, 4 parts of ammonium sulphate and 1.5 parts of sodium ammonium phosphate as catalyst are added with thorough stirring to the urea-formaldehyde solution. A stable dispersion is obtained on completion of polycondensation. Free formaldehyde and unreacted N-methylol groups are bonded by aftertreatment with 5 parts of methyl hydrazine for 4 minutes at 30° C.

EXAMPLE 4

The procedure is exactly the same as in Example (1b), except that the quantity of the reaction mixture is reduced 10 fold by using 1693 parts of polyether with the composition described in Example (1a), 276 parts of urea, 460 parts of a 30% formalin solution, 92 parts of ε-caprolactam and, in addition, 20 parts of a relatively high molecular weight α,ω-diurea diurethane polyether as elasticizing urea. To prepare this bis-urea, 1 mol of an α,ω-dihydroxy polyethylene glycol having an average molecular weight of 2000 was reacted with 2 mols of hexamethylene diisocyanate and the NCO-prepolymer formed subsequently reacted with 2 mols of ammonia.

A stable aqueous dispersion is obtained on completion of polycondensation under the conditions of Example (1b). The free formaldehyde and the unreacted N-methylol groups are bonded in the same was as in Example 1, except that only 184 parts of methylamine are used.

EXAMPLE 5

The procedure is as in Example 4, except that a hot aqueous solution of 1 mol of trimethylol melamine and 2 mols of dicyanodiamide is additionally added during condensation. Stable crosslinked polymethylene ureas modified by condensation with melamine and dicyanodiamide are obtained by the procedure of Example 4. The white dispersions obtained are completely stable. The free formaldehyde and the unreacted N-methylol groups are bonded in the same way as described in Example (1b), except that only 184 parts of methylamine are used.

EXAMPLE 6

The procedure is as in Example (1b), except that the quantity of the reaction mixture is reduced 10 fold and does not contain any hydrochloric acid as catalyst, polycondensation merely being carried out by heating over a period of 4 hours at 80° C. Following removal of the water of condensation at 100° C., a stable dispersion is obtained in which the free formaldehyde is substantially bonded in the form of triethyl hexahydrotriazine by gassing with 23 parts of ethylamine for 8 minutes at 30° C. Excess ethylamine and the triethyl hexahydrotriazine formed are removed over a period of 1 hour at 120° C./14 Torr.

EXAMPLE 7

The procedure is as in Example 4 and Example (1b), except that a freshly prepared solution of 1 mol of urea, 1 mol of isobutyraldehyde, 1 mol of thiourea and 1 mol of croton aldehyde, is additionally added. A stable aminoplast dispersion is obtained on completion of polycondensation under the conditions of Example (1b).

The excess quantities of free aldehydes are converted into the corresponding bis-aldimines by treating the dispersion with 70 parts of hexamethylene diamine, with removal of the water formed by distillation, at 80° C./14 Torr.

EXAMPLE 8

The procedure is as in Example (1b), except that the ε-caprolactam is replaced by the following chain terminators:
(a) 17 parts of dichloromaleic imide
(b) 25 parts of phenothiazine
(c) 14 parts of trichloroacetic acid amide
(d) 18 parts of 2-chloro-4,6-bis-ethyl-amino-s-triazine
(e) 15 parts of maleic acid hydrazide
(f) 21 parts of pentachlorobenzamide
(g) 16 parts of 1,3-dimethyl-3-(2-benzothiazolyl)-urea Compounds (a) to (g) are suspended or dissolved in the polyether. The urea-formaldehyde condensation reaction is then carried out in accordance with Example (1b). Stable aminoplast dispersions are obtained in which the chain terminators added are present in the polymethylene ureas in largely co-condensed form or as chain terminators. In all cases (a) to (g), free formaldehyde is bonded by reaction with 319 parts of n-butylamine for 3 minutes at 30° C. The excess n-butylamine and the tributyl hexahydrotriazine formed is subsequently removed over a period of 1 hour by vacuum treatment at 140°C./14 Torr.

EXAMPLE 9

The procedure is exactly the same as in Example (1b), except that the size of the reaction mixture is reduced 10 fold and the following polyhydroxyl compounds are used as dispersants:
  (a) 1693 parts of a linear propylene glycol polyether with terminal, largely secondary hydroxyl groups having an average molecular weight of 2000, a hydroxyl group content of 1.7% and an OH number of 56.
  (b) 1693 parts of a trifunctional polyether of trimethylol propane, propylene oxide and ethylene oxide, the propylene oxide: ethylene oxide ratio of 87:13 with the polyether containing primary hydroxyl groups and having an OH number of 35.
  (c) 1693 parts of a trifunctional polyether of trimethylol propane, propylene oxide and ethylene oxide, the propylene oxide: ethylene oxide ratio amounting to about 87:13 with the polyether containing primary hydroxyl groups and having an OH-number of 28.

Reaction of the free formaldehyde present in the liquid dispersion (formaldehyde content approximately 0.6% by weight) is carried out in the same way as in Example 1, except that in case (a) the free formaldehyde is reacted with 32 parts of diethanolamine to form oxazolidine, in case (b) with 28 parts of methyl-bis-(3-aminopropyl)-amine

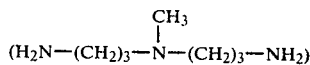

to form polyhexahydrotriazine and in case (c) with 21 parts of N,N-dimethyl-trimethylene diamine to form highly active, strongly basic hexahydrotriazines soluble in the polyether. The hexahydrotriazines obtained in cases (b) and (c) show strong catalytic activity, so that, when these dispersions are used for the production of polyurethane foams, the quantity of activators normally added can be reduced of about half (cf. Examples 23 and 24).

EXAMPLE 10

The procedure is exactly the same as in Example (1b), except that the formaldehyde is replaced by the following aldehydes and the reaction carried out on a 100 times smaller scale:
  (a) 0.46 mol of acetaldehyde
  (b) 0.46 mol of isobutyraldehyde
  (c) 0.46 mol of croton aldehyde
  (d) 0.46 mol of chloral
  (e) 0.46 mol of acrolein Stable dispersions of aminoplast condensates with solids contents of approximately 20% by weight are obtained in all cases (a) to (e). In all cases, the free aldehydes are reacted at 30° C. with 184 parts of gaseous methyl amine. Water, excess amine and Schiff's bases are removed over a period of 1 hour at 130° C./14 Torr.

EXAMPLE 11

This example demonstrates the production of graphite-like aminoplast dispersions of benzoquinone and ammonia in a linear hydroxyl polyether of propylene oxide having an average molecular weight of 2000.

180 parts of the above-mentioned polyether (OH number 56) and 20 parts of p-benzoquinone are treated with a stream of ammonia gas at a temperature of 80° C. Graphite-like dispersions are immediately formed, while the unreacted p-benzoquinone is dissolved in the polyether. After 1 hour, the p-benzoquinone has been quantitatively reacted to form aminoplast condensates. Small quantities of water (2.1 parts) are removed over a period of 30 minutes in a water jet vacuum. A black, 10% by weight dispersion of aminoplast condensates is obtained. Small quantities of benzoquinone are bonded by reaction with 4 parts by weight of n-butylamine for 10 minutes at 100° C. Excess butylamine is removed over a period of 30 minutes at 100° C./14 Torr.

EXAMPLE 12

This example demonstrates the production of aminoplast condensates from a number of formaldehyde-crosslinked polyhydrazodicarbonamide dispersions:

7.3 parts of hydrazine hydrate are dissolved in 500 parts of a polyether having a hydroxyl number of 28, which has been obtained by the addition of propylene oxide and then ethylene oxide and then ethylene oxide with trimethylol propane and 67% by weight of whose OH-groups are primary OH-groups. 25.3 parts of a mixture of 2,4- and 2,6-tolylene diisocyanate (80% by weight of 2,4- and 20% by weight of 2,6-isomers) are then separately dissolved in another 500 parts of the same polyether. The polyether-tolylene diisocyanate solution is then run very quickly with stirring into the polyether-hydrazine hydrate solution, the mixture immediately becoming clouded. After the two solutions have been combined, they are stirred for 5 minutes, subsequently reacted with 20 parts of a 30% formalin solution in a water jet vacuum at 60° C. to form crosslinked aminoplast dispersions and the water removed by distillation. Small quantities, amounting to approximately 0.6% by weight, of formaldehyde are bonded by the addition of 11 parts of diethanolamine at 60° C. A white-colored, clouded polyether dispersion is obtained which has a hydroxyl number of 25 and a viscosity of 3400 cP at 25° C. and which contains approximately 3.5% by weight of aminoplast dispersion.

The following examples demonstrates the processing of the dispersions described in Examples 1 to 12 to form highly elastic foams:

EXAMPLE 13

100 parts of the dispersion prepared in accordance with Example (1b), 2.5 parts of water, 0.2 parts of triethylene diamine, 0.8 part of N-ethyl morpholine, 0.03 part of dibutyl tin dilaurate, 0.1 part of a standard commercial-grade polyether polysiloxane stabilizer (L 520 from Union Carbide Corp.) which is believed to be a polyether-polysiloxane blockcopolymer having a molecular weight of about 6000 and 0.8 part of a silicone oil of the formula

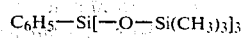

(to improve the peripheral zones of the foam) are mixed together 29.5 parts of tolylene diisocyanate (80% of 2,4- and 2,6-isomer) are added to the mixture thus prepared and thoroughly mixed with it by means of a high-speed stirrer. Foam formation begins after a latent time of 8 seconds and is over after a rise time of 80 seconds. The highly elastic foam obtained has the following properties:

Density (kg/m$^3$) according to DIN 53 420: 39
Tensile strength (Kp/cm$^2$) according to DIN 53 571: 1.5
Elongation at break (%) according to DIN 53 571: 190
Compression hardness at 40% compression (p/cm$^2$) according to DIN 53 577: 34
Tear propagation resistance (KN/m) according to ASTM D 1564-71: 0.32
Inflammability according to ASTM 1962-68 length Burn (cm), mean value: 3.5
Average extinguishing time (seconds): 29

EXAMPLE 14

300 parts of the dispersion prepared in accordance with Example 2, 300 parts of a polypropylene glycol started with trimethylol propane and modified with ethylene oxide in such a way that approximately 67% of primary terminal hydroxyl groups are obtained for an OH number of 28.0, 18 parts of water, 1.2 parts of triethylene diamine, 5.0 parts of N-methyl morpholine, 1.2 parts of tin dioctoate, 0.3 parts of the polyether polysiloxane stabilizer used in Example 13 and 6.0 parts of the silicone oil used in Example 13 (to improve the peripheral zones of the foam) are mixed together. 235 parts of an isocyanate mixture of 80% by weight of tolylene diisocyanate (80% of 2,4- and 20% of 2,6-isomer) and 20% by weight of a polymeric 4,4'-diisocyanatodiphenyl methane are added to the mixture thus prepared and thoroughly mixed with it by means of a high-speed stirrer. The resulting reaction mixture is poured into a metal mold measuring 40×40×12.5 cm which has been preheated to 40° C. The mold is closed with a cover. No heat is applied to the outside of the mold. After 8 minutes, the molding is removed. The highly elastic foam has the following properties:

Density (kg/m$^3$) according to DIN 53 420: 40
Tensile strength (Kp/cm$^2$) according to DIN 53 571: 1.6
Elongation at break (%) according to DIN 53 571: 180
Compression hardness at 40% compression (p/cm$^2$) according to DIN 53 571: 29
Tear propagation resistance (KN/m) according to ASTM D 1564-71: 0.36
Inflammability according to ASTM 1962-68 length burn (cm), mean value: 4.2
Average extinguishing time (seconds): 34

EXAMPLE 15

100 parts of the dispersion prepared in accordance with Example 3, 2.5 parts of water, 0.2 part of triethylene diamine, 0.8 part of N-ethyl morpholine, 0.03 part of dibutyl tin dilaurate, 0.1 part of the polyethersiloxane used in Example 13 and 0.8 part of the solicone oil used in Example 13 (for improving the peripheral zones of the foam) are mixed together. 29.5 parts of tolylene diisocyanate (80% of 2,4- and 20% of 2,6-isomer) arre added to the mixture thus prepared and thoroughly mixed with it by means of a high-speed stirrer. Foam formation begins after a latent time of 8 seconds and is over after a rise time of 80 seconds. The highly elastic foam obtained has the following properties:

Density (kg/m$^3$) according to DIN 53 420: 38
Tensile strength (Kp/cm$^2$) according to DIN 53 571: 1.3
Elongation at break (%) according to DIN 53 571: 160
Compression hardness at 40% compression (p/cm$^2$) according to DIN 53 577: 32
Tear propagation resistance (KN/m) according to ASTM D 1564-71: 0.29
Inflammability according to ASTM 1962-68 length burn (cm), mean value: 2.7
Average extinguishing time (seconds): 23

EXAMPLE 16

420 parts of the dispersion prepared in accordance with Example 4, 180 parts of a polypropylene oxide started with trimethylol propane and modified with ethylene oxide in such a way that approximately 67% of primary terminal hydroxyl groups are obtained for an OH number of 35, 18 parts of water, 0.9 part of triethylene diamine, 1.1 parts parts of tin dioctoate, 3.6 parts of the polyether polysiloxane stabilizer used in Example 13 are mixed together. 205 parts of tolylene diisocyanate (71% of 2,4- and 29% of 2,6-isomer) are added to this mixture and thoroughly mixed with it by means of a high-speed stirrer. The resulting reaction mixture is poured into a metal mold measuring 40×40×12.5 cm which has been preheated to 35° C. The mold is closed with a perforated cover and subsequently placed for 20 minutes in an oven having an air temperature of 150° C. The resulting elastic foam is open-pored and has the following properties:

Density (kg/m$^3$) according to DIN 53 420: 35
Tensile strength (Kp/cm$^2$) according to DIN 53 571: 1.9
Elongation at break (%) according to DIN 53 571: 240
Compression hardness at 40% compression (p/cm$^2$) according to DIN 53 577: 42
Tear propagation resistance (KN/m) according to ASTM D 1564-71: 0.47

EXAMPLE 17

300 parts of the dispersion prepared in accordance with Example 5, 300 parts of a polypropylene glycol started with trimethylol propane and modified with ethylene oxide in such a way that approximately 72% of primary terminal hydroxyl groups are obtained for an OH number of 28.0, 18 parts of water, 1.0 part of triethylene diamine, 5.0 parts of N-methyl morpholine, 1.2 parts of tin dioctoate, 0.3 part of the polyether silicone stabilizer used in Example 13 and 6.0 parts of the silicone oil used in Example 13 (for improving the peripheral zones of the foam) are mixed together. 210 parts of tolylene diisocyanate (80% of 2,4- and 20% of 2,6-isomer) are added to the mixture thus prepared and mixed with it by means of a high-speed stirrer. The resulting reaction mixture is poured into a metal mold measuring 40×40×12.5 cm which has been preheated to 40° C. The mold is closed with a lid. No heat is applied to the outside of the mold. After 8 minutes the molding is removed from the mold. The highly elastic foam has the following properties:

Density (kg/m$^3$) according to DIN 53 420: 41

Tensile strength (Kp/cm$^2$) according to DIN 53 571: 1.5

Elongation at break (%) according to DIN 53 571: 175

Compression hardness at 40% compression (p/cm$^2$) according to DIN 53 577: 32

Tear propagation resistance (KN/m), according to ASTM D 1564-71: 0.34

Inflammability according to ASTM 1962-68 length burn (cm), mean value: 40

Average extinguishing time (seconds): 29

EXAMPLE 18

100 parts of the dispersion prepared in accordance with Example 6, 2.8 parts of water, 0.15 part of triethylene diamine, 0.4 part of triethylamine, 0.1 part of the polyether polysiloxane stabilizer used in Example 13 and 1.0 part of the silicone oil used in Example 13 (for improving the peripheral zones of the foam) are mixed together, 32.4 parts of tolylene diisocyanate (80% of 2,4- and 20% of 2,6-isomer) are added to the resulting mixture and thoroughly mixed with it by meands of a high-speed stirrer. Foam formation begins after a latent time of 7 seconds and is over after a rise time of 75 seconds. The highly elastic foam obtained has the following properties:

Density (kg/m$^3$) according to DIN 53 420: 37

Tensile strength (Kp/cm$^2$) according to DIN 53 571: 14

Elongation at break (%) according to DIN 53 571: 150

Compression hardness at 40% compression (p/cm$^2$) according to DIN 53 577: 30

Tear propagation resistance (KN/m) according to ASTM D 1564-71: 0.26

Inflammability according to ASTM 1962-68 length burn (cm), mean value: 2.8

Average extinguishing time (seconds): 23

EXAMPLE 19

300 parts of the dispersion prepared in accordance with Example 7, 300 parts of a polypropylene glycol started with glycerol and modified with ethylene oxide in such a way that approximately 72% of primary terminal hydroxyl groups are obtained for an OH number of 35.0, 19.2 parts of water, 1.0 part of triethylene diamine, 3.0 parts of N-ethyl morpholine, 12.0 parts by weight of triethanolamine, 0.18 part of dibutyl tin dilaurate and 6.0 parts of the silicone oil used in Example 13 (to improve the peripheral zones of the foam) are mixed together. 284 parts of a standard commercial-grade solution (NCO=39.5%) of polymeric tolylene diisocyanate containing isocyanate groups in tolylene diisocyanate are added to the resulting mixture and thoroughly mixed with it by means of a high-speed stirrer. The reaction mixture is poured into an epoxide resin mold measuring 40×40×12.5 cm. The mold is closed with a cover. No heat is applied to the outside of the mold. After 10 minutes, the molding is removed from the mold. The highly elastic foam has the following properties:

Density (kg/m$^3$) according to DIN 53 420: 41

Tensile strength (Kp/cm$^2$) according to DIN 53 571: 1.4

Elongation at break (%) according to DIN 53 571: 150

Compression hardness at 40% compression (p/cm$^2$) according to DIN 53 577: 36

Tear propagation resistance (KN/m) according to ASTM D 1564-71: 0.24

Inflammability according to ASTM 1962-68 length burn (cm), mean value: 5.0

Average extinguishing time (seconds): 36

EXAMPLE 20

100 parts of the disperaion prepared in accordance with Example 8f) 2.5 parts of water, 0.22 part of triethylene diamine, 0.05 part of the polyether polysiloxane stabilizer used in Example 13 and 1.0 part of the silicone oil used in Example 13 (to improve the peripheral zones of the foam) are mixed oil (to improve the peripheral zones of the foam) are mixed together. 29.5 parts of tolylene diisocyanate (65% of 2,4- and 35% of 2,6-isomer) are added to the resulting mixture and mixed with it by means of a high-speed stirrer. Foam formation begins after a latent time of 8 seconds and is over after a rise time of 90 seconds. The highly elastic foam obtained has the following properties:

Density (kg/m$^3$) according to DIN 53 420: 36

Tensile strength (Kp/cm$^2$) according to DIN 53 571: 1.6

Elongation at break (%) according to DIN 53 571: 200

Compression hardness at 40% compression (p/cm$^2$) according to DIN 53 577: 32

Tear propagation resistance (KN/m) according to ASTM D 1564-71: 0.34

Inflammability according to ASTM 1962-68 Length burn (cm), mean value: 2.3

Average extinguishing time (seconds): 21

EXAMPLE 21

50 parts of the dispersion prepared in accordance with Example (9a), 50 parts of a polypropylene oxide started with trimethylol propane and modified with ethylene oxide in such a way that approximately 45% of primary terminal hydroxyl groups are obtained for an OH number of 56, 3.5 parts of water, 0.15 parts of triethylene diamine, 0.11 part of tin dioctoate and 0.7 part of the polyether polysiloxane stabilizer used in Example 13 are mixed together. 44 parts of tolylene diisocyanate (80% of 2,4- and 20% of 2,6-isomer) are added to the resulting mixture and thoroughly mixed with it by means of a high-speed stirrer. Foam formation begins after a latent time of 8 seconds and is over after a rise time of 80 seconds. The foam reacts for 20 minutes in an over with an air temperature of 150° C. The elastic foam has the following properties:

Density (kg/m$^3$) according to DIN 53 420: 30

Tensile strength (Kp/cm$^2$) according to DIN 53 571: 1.2

Elongation at break (%) according to DIN 53 571: 260

Compression hardness at 40% compression (p/cm$^2$) according to DIN 53 577: 22

Tear propagation resistance (KN/m) according to ASTM D 1564-71: 0.42

EXAMPLE 22 (comparison example)

22,350 parts of the dispersion prepared in accordance with Example (9c) of Ser. No. 464,099, 22,350 parts of a polypropylene glycol started with trimethylol propane and modified with ethylene oxide in such a way that approximately 67% of primary terminal hydroxyl groups are obtained for an OH number of 35.0, 1250 parts of water, 450 parts of triethylene diamine, 26.8 parts of 2,2'-bis-dimethyl aminodiethyl ether, 178 parts of the polyether polysiloxane stabilizer, used in Example 13 450 parts of tin dioctoate and 900 parts of tris-2,3-dibromopropyl phosphate, are mixed together. 16,450 parts of tolylene diisocyanate (80% of 2,4- and 20% of 2,6-isomer) are added to the resulting mixture and thoroughly mixed with it by means of a high-speed stirrer. The reaction mixture is poured into a box measuring 200×100×120 cm. A block of highly elastic foam is formed. A foam sample taken from the middle of the block showed the following properties:

Density (kg/m$^3$) according to DIN 53 420: 29

Tensile strength (Kp/cm$^2$) according to DIN 53 571: 1.0

Elongation at break (%) according to DIN 53 571: 170

Compression hardness at 40% compression (p/cm$^2$) according to DIN 53 577: 24

Tear propagation resistance (KN/m) according to ASTM D 1564-71: 0.28

Inflammability according to ASTM 1962-68 length burn (cm), mean value: 6.3

Average extinguishing time (seconds): 41

After storage for 1 month, the foam has a noticeable formaldehyde odor.

EXAMPLE 23

This example demonstrates that the aminoplast dispersion prepared in accordance with Example (9c) of the instant specification, which contains per 100 parts by weight of solids approximately 1.28 parts by weight of the strongly basic hexahydrotriazine

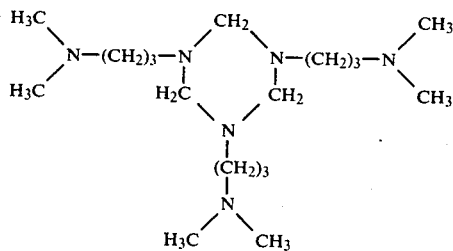

which is involatile in vacuo at 14 Torr/140° C., enables about half the triethylene diamine (=endoethylene piperazine)

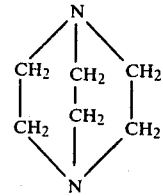

in relation to Comparison Example 22 to be saved in the production of foams.

22,350 parts of the dispersion prepared in accordance with Example (9c) of the instant specification, 22,350 parts of a polypropylene glycol started with trimethylol propane and modified with ethylene oxide in such a way that approximately 67% of primary terminal hydroxyl groups are obtained for an OH number of 35.0, 1250 parts of water, only 240 parts of triethylene diamine, 26.8 parts of 2,2'-bis-dimethyl aminodiethyl ether, 178 parts of the polyether polysiloxane stabilizer used in Example 13, 450 parts of tin dioctoate and 900 parts of tris-2,3-dibromopropyl phosphate are mixed together. 16,450 parts of tolylene diisocyanate (80% of 2,4- and 20% of 2,6-isomer) are added to this mixture and mixed thoroughly with it by means of a high-speed stirrer. The reaction mixture is poured into a box measuring 200×100×120 cm. A block of highly elastic foam is formed. A foam sample taken from the middle of the block showed the following properties:

Density (kg/m$^3$) according to DIN 53 420: 33

Tensile strength (Kp/cm$^2$) according to DIN 53 571: 1.2

Elongation at break (%) according to DIN 53 571: 165

Compression hardness at 40% compression (p/cm$^2$) according to DIN 53 577: 27

Tear propagation resistance (KN/m) according to ASTM D 1564-71: 0.25

Inflammability according to ASTM 1962-68 length burn (cm), mean value: 6.4

Average extinguishing time (seconds): 42

This foam does not give off any formaldehyde odor even at 120° C.

EXAMPLE 24

This example shows that the aminoplast dispersion prepared in accordance with Example 9b) of the instant specification, which contains per 100 parts by weight of liquid dispersion approximately 1.72 parts of a branched or crosslinked polyhexahydro triazine with the idealized constitution

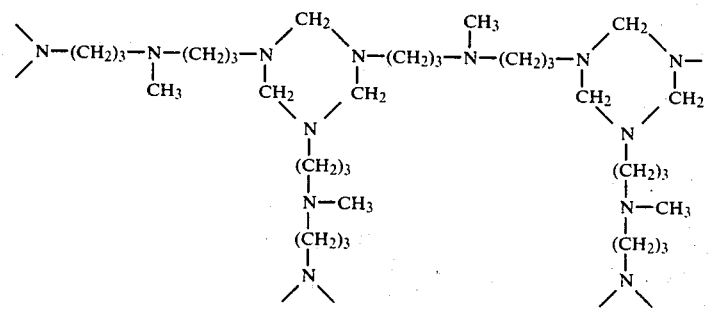

enables almost half the expensive triethylene diamine (for constitution see Example 23) to be saved in the production of foams.

22,350 parts of the dispersion prepared in accordance with Example (9b), 22,350 parts of a polypropylene glycol started with trimethylol propane and modified with ethylene oxide in such a way that approximately 67% of primary terminal hydroxyl groups are obtained for an OH number of 35.0, 1250 parts of water, 250 parts of triethylene diamine, 26.8 parts of 2,2'-bis-dimethylamino diethyl ether 178 parts of the polyether polysiloxane stabilizer used in Example 13, 450 parts of tin dioctoate and 900 parts of tri-2,3-dibromopropyl phosphate, are mixed together. 16,450 parts of tolylene diisocyanate (80% of 2,4- and 20% of 2,6-isomer) are added to the resulting mixture and thoroughly mixed with it by means of a high-speed stirrer. The reaction mixture is poured into a box measuring $200 \times 100 \times 120$ cm. A block of highly elastic foam is formed. A sample of foam taken from the middle of the block showed the following properties:

Density (kg/m$^3$) according to DIN 53 420: 32
Tensile strength (Kp/cm$^2$) according to DIN 53 571: 1.1
Elongation at break (%) according to DIN 53 571: 175
Compression hardness at 40% compression (p/cm$^2$) according to DIN 53 577: 28
Tear propagation resistance (KN/m) according to ASTM D 1564-71: 0.23
Inflammability according to ASTM 1962-68 length burn (cm), mean value: 6.2
Average extinguishing time (seconds): 43

This foam does not give off any formaldehyde odor even at 120° C.

EXAMPLE 25

50 parts of the dispersion prepared in accordance with Example 11, 50 parts of a polypropylene oxide started with trimethylol propane and modified with ethylene oxide in such a way that approximately 45% of primary terminal hydroxyl groups are obtained for an OH number of 56, 3.5 parts of water, 0.13 part of triethyl diamine, 0.13 part of tin dioctoate and 0.8 part of a the polyether polysiloxane stabilizer used in Example 13, are mixed together. 44 parts of tolylene diisocyanate (80% of 2,4- and 20% of 2,6-isomer) are added to the resulting mixture and thoroughly mixed with it by means of a high-speed stirrer. Foam formation begins after a latent time of 8 seconds and is over after a rise time of 80 seconds. The foam reacts to completion over a period of 20 minutes in an oven with an air temperature of 150° C. The black-colored elastic foam has the following properties:

Density (kg/m$^3$) according to DIN 53 420: 28
Tensile strength (Kp/cm$^2$) according to DIN 53 571: 1.4
Elongation at break (%) according to DIN 53 571: 220
Compression hardness at 40% compression (p/cm$^2$) according to DIN 53 571: 23
Tear propagation resistance (KN/m) according to ASTM D 1564-71: 0.50

EXAMPLE 26

100 parts of the aminoplast dispersion prepared in accordance with Example 12 are mixed with 2.9 parts of water, 0.3 part of triethylene diamine, 0.25 part of tin(II) octoate and 34.5 parts of a mixture of 2,4- and 2,6-tolylene diisocyanate (80% of 2,4- and 20% of 2,6-isomer). Foam formation begins after a latent time of 8 seconds and is over after 80 seconds.

The foam obtained is highly elastic, is stabilized against discoloration by industrial waste gases and light, unlike conventional foams, and does not give off any formaldehyde odor, even at 100° C.

EXAMPLE 27 (comparison example)

The procedure is exactly the same as in Example 15 of Ser. No. 464,099. Experience has shown that, in the absence of the "amine" aftertreatment of the dispersions in accordance with the instant invention, a strong smell of formaldehyde is given off from the dispersions in containers after storage for about 2 months, and that, even in the case of freshly prepared dispersions, and with the size of the foaming mixture increased by about the factor 2 in relation to Example 15 of the earlier application, extremely troublesome shrinkage occurs during foaming, amounting to between 10 and 15% of the primary rise volume during the foaming process. Extraction of the dispersion by shaking with water, followed by formaldehyde titration, shows that approximately 0.6 to 0.8% by weight of formaldehyde is originally present in the water-free dispersion. If this quantity of free formaldehyde per 100 parts by weight of dispersion is bonded by (a) gassing with ethylamine (5 parts) for 10 minutes at room temperature,
(b) treatment with dimethyl amine (4 parts) for 8 minutes at room temperature, and freed from water and excess amines and hexahydrotriazines formed or the following aminal

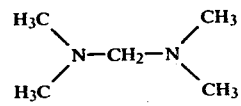

the unfavorable shrinkage and formaldehyde-eliminating effects do not occur and foams with a property level substantially corresponding to the property level of Example 14 herein are obtained after foaming in accordance with Example 14 of this application. In these foams, no formaldehyde is given off, even when the cellular plastics are after-heated to 60°–120° C.

EXAMPLE 28 (comparison example)

Although the dispersion obtained in accordance with Example 6 of Ser. No. 464,099 and freed from formaldehyde by treatment with ammonia gas to form hexamethylene tetramine does not show any reformation of formaldehyde, the total insolubility of the hexamethylene tetramine in the aminoplast dispersion (and presumably its pronounced crystallinity in the cell "bridges" of the foam) cause an appreciable reduction in the tensile strength of the foams produced.

When dispersion of Example 6 of Serial No. 464,099 is processed in exactly the same way as in Example 14 of the present application, the foam obtained has a tensile strength (KP/cm$^2$) according to DIN 53 571 of only 0.9 as against 1.6 in Example 14.

What is claimed is:
1. In a process for the production of dispersions of aminoplast condensates in organic polyhydroxyl compounds by the oligo-condensation or polycondensation of substances capable of aminoplast formation, in said organic polyhydroxyl compounds, the improvement wherein said dispersions are reacted at from about −5° C. to about 180° C. with an amine compound selected from the group consisting of:

(a) aliphatic or cycloaliphatic mono- or polyamine containing at least one primary or secondary amine group, and which are gaseous or liquid at room temperature, and (b) alkyl hydrazines containing at least one primary or secondary amine group and which are gaseous or liquid at room temperature.

2. The process of claim 1 wherein said dispersion is reacted with said amine compound at a temperature of from about 10° C. to about 120° C.

3. The process of claim 1, wherein said amine compound is an organic aliphatic or cycloaliphatic mono- or polyamine having a molecular weight of from 31 to 260.

4. The process of claim 1 wherein said amine compound is an organic alkyl hydrazine having a molecular weight from 46 to 200.

5. The process of claim 1, wherein said amine compound is selected from the group consisting of aminoethanol, 2-aminopropanol, diethanolamine, bis-(2-hydroxypropyl)-amine, N,N-dimethylpropylene diamine and methyl-bis-(3-amino-propyl)-amine.

6. The process of claim 1 wherein said amine compounds are used in a quantity of from about 0.01 to about 4 mols per 100 grams of dispersed aminoplast solids.

7. The process of claim 6, wherein said quantity is from about 0.01 to about 1 mol per 100 grams of dispersed aminoplast solids.

8. The process of claim 7, wherein said quantity is from about 0.05 to about 0.4 mol per 100 grams of dispersed aminoplast solids.

9. The product of the process of claim 1.

* * * * *